United States Patent [19]
Hasegawa

[11] 3,762,286
[45] Oct. 2, 1973

[54] EXPOSURE CONTROL SYSTEM FOR A SINGLE LENS REFLEX CAMERA WITH AN INTERCHANGEABLE OBJECTIVE LENS

[75] Inventor: Goro Hasegawa, Fuchi-shi, Tokyo, Japan

[73] Assignee: Canon Kabushiki Kaisha, Tokyo, Japan

[22] Filed: July 16, 1971

[21] Appl. No.: 163,233

[30] Foreign Application Priority Data
July 23, 1970 Japan.............................. 45/64549

[52] U.S. Cl. .............................. 95/10 C, 95/10 PO
[51] Int. Cl. ............................................ G03b 7/04
[58] Field of Search ........... 95/10 C, 10 CE, 10 CT, 95/10 CD, 10 PO, 42, 64 D

[56] References Cited
UNITED STATES PATENTS

| | | |
|---|---|---|
| 3,450,016 | 6/1969 | Yamada.......................... 356/222 X |
| 3,511,142 | 5/1970 | Biber................................. 95/10 |
| 3,608,450 | 9/1971 | Shimomura............................ 95/10 |
| 3,308,733 | 3/1967 | Albedyll et al. ..................... 95/10 |
| 3,324,776 | 6/1967 | Matsumoto......................... 95/42 X |
| 3,461,783 | 8/1969 | Fujii........................................ 95/10 |
| 3,486,434 | 12/1969 | Siyuki et al......................... 95/10 X |
| 3,505,938 | 4/1970 | Zorbel et al............................. 95/10 |
| 3,532,043 | 10/1970 | Shimomura............................ 95/10 |
| 3,561,342 | 2/1971 | Starp....................................... 95/10 |
| 3,601,022 | 8/1971 | Langnau .............................. 95/10 |

Primary Examiner—Samuel S. Matthews
Assistant Examiner—Michael L. Gellner
Attorney—David Toren et al.

[57] ABSTRACT

In the disclosed system, a plurality of electro-photosensitive elements are distributed to sense light at different vertical positions in the field of view transmitted by the interchangeable objective of a single lens reflex camera. Each objective includes a compensating member that selects one of the elements and connects it into the exposure control system of the camera. Each objective then shifts the position of maximum light sensitivity of the exposure control system to different positions. A wide angle lens shifts the maximum sensitivity to the lower portion of the picture being taken, while a telephoto lens shifts the position of maximum sensitivity to the upper portion of the picture to be taken.

22 Claims, 8 Drawing Figures

FIG. 3b
WIDE ANGLE LENS

FIG. 3c
STANDARD LENS

FIG. 3d
TELE PHOTO LENS

EXPOSURE CONTROL SYSTEM FOR A SINGLE LENS REFLEX CAMERA WITH AN INTERCHANGEABLE OBJECTIVE LENS

BACKGROUND AND SUMMARY OF THE INVENTION

The present invention relates to an exposure control system for a single lens reflex camera and particularly to an exposure control system capable of operating with interchangeable objective lenses.

In an exposure control system for a single lens reflex camera the light passing through an objective lens is received by a photoelectric element, while the diaphragm of the objective lens is fully opened. This moves a pointer of an ammeter. The transposition of the pointer is automatically used by a mechanical scanning member to adjust the diaphragm of the photographing lens to an appropriate exposure value.

Practically the invention relates to an exposure control system for such camera as mention above having such arrangement that a photographing (shooting) distance adjusting device is provided at a camera body for adjusting the photographing distance of each interchangeable lens, wherein said distance adjusting device and a variable resistance in the circuit can be associated to each other, and the diaphragm of the photographing lens is automatically adjusted by using an amperemeter within the circuit.

When lenses having different maximum aperture diameter are mounted, there generated difference in the intensity of the light reaching the photosensitive member such as film by said difference in the maximum aperture diameters, and as a result there will be a difference in the swing of the amperemeter pointer.

The optimum exposure can not be obtained in this state, thus some compensation is necessary. At present such compensation is done manually or automatically, but in the former system while the structure is simple and is easy to make, it is not inconvenient to set the same every time lens is changed. On the other hand, in the system in which compensation is done automatically the interchangeable lens has such signal as corresponding to the maximum aperture diameter, wherein the compensation is done by rotating the amperemeter by said signal or by shifting an aperture value indicating plate or a scanning member, and the structure within a body becomes complicated, further there in a positional restriction in transmitting the signal of lens to the body. The main object of the present invention is to automatically compensate the difference in the maximum aperture diameter of the lens by such arrangement with simple structure that the signal of lens can be transmitted without positional restriction further in an automatic manner.

Another object of the present invention is to obtain such system that when an interchangeable lens with different focal distance is mounted, such sensing range distribution characteristic as corresponding to each interchangeable lens is attained, and even when photographing is done at such position as determining a composition, a proper exposure can be obtained.

Still another object of the present invention is to obtain such system that an artificial light photographing can be done by a same method as in a day light photographing, wherein compensation is automatically is done by simple means for lenses with different focal distances (for example a wide angle lens) with a series of variable resistances providing proper exposure for one lens (for example a standard lens).

Further another object of the present invention is to obtain proper exposure automatically, when an object is of low illumination, by an auxiliary device in surer manner and with simple structure device.

The main feature of the present invention lies in an exposure control system for a single lens reflex camera with an interchangeable objective lens comprising in combination, a. an amperemeter for the indication of an exposure condition,
b. a power source for bringing said amperemeter into a normally operative condition,
c. a variable electric element for the settlement of at least a photographic information parameter,
d. an exposure controlling means for controlling the light amount reaching the photosensitive member,
e. a circuit network for operatively connecting said amperemeter, said power source and said variable element with each other, and
f. a change-over means for selecting the value of said variable electric element to attain a normally operative exposure control system being attained by mounting an interchangeable objective lens having its own feature signal provided thereon onto a camera body in a manner that said feature signal is adapted to cooperate effectively with and to change over said change-over means to attain an automatic selection of the normally operative exposure system suited for the interchangeable objective lens mounted on the camera body.

The other objects and features, and advantages of the present invention shall be described in reference to the attached drawings.

FIG. 3 (a) is a circuit diagram showing the method of changing over switch in the circuits shown in FIG. 1.

FIGS. 3(b) to 3(a) show the relationship between each interchangeable lens and a change over switch for mounting the same, wherein field of vision and sensing sensitivity for a same object of most ordinary nature at that time are shown by chain line.

Figure 1:
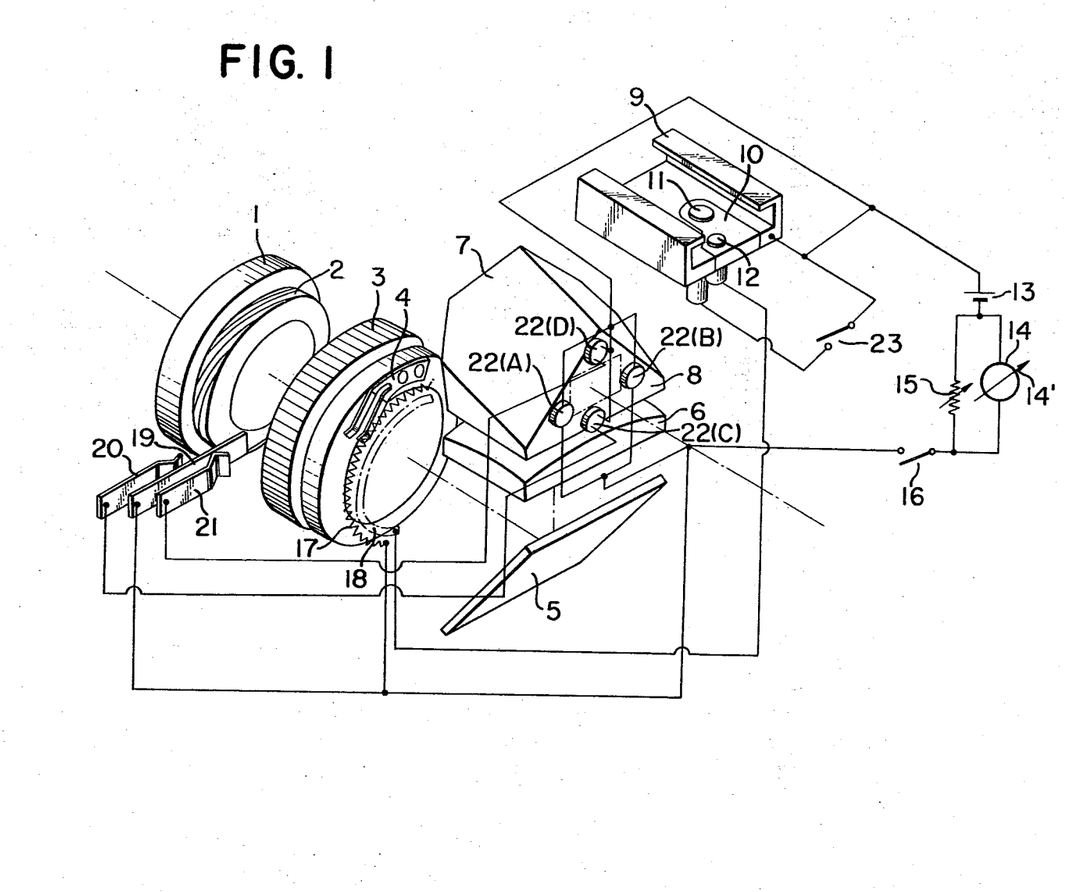
FIG. 1 is a sketch showing the relationship between the major elements of a camera and electric circuits.

In FIG. 1, 1 is lens barrel of lens, 2 is a threaded part for mounting the lens barrel 1 for lens to a body and 3 is adjusting ring for photographing distance.

4 is a sliding piece having a spring characteristics, jointly working with 3, 5 is reflective mirror for finder, 6 is condensor lens, 7 is pentagonal prism, 8 is rear face of the pentagonal prism 7, 9 is an accessory mounting member for a camera, 10 is an insulator, 11 is a terminal which is insulated from the accessory mounting member 9 by the insulator 10, 12 is same as 11, 13 is power source, 14 is an amperemeter, 14' is a pointer, 15 is a variable resistance which is changed by exposure elements, that is shutter speed, film sensitivity, etc. and 16 is a main switch.

17 is a variable resistance which contacts one of the feet of the sliding piece 4, 18 is a conductive material which conducts the other foot of the sliding piece 4, 19 is a plate spring for switch, 20 is a contact plate for switch, 21 is a contact plate for switch and 23 is a synchronized switch to ignite the flash.

In FIG. 1, the light passing through the objective lens 1 the aperture is completely open is reflected by the mirror 5 onto a finder system to form an image, which can be observed through a condensor lens 6, a pentagonal prism 7 and an eye-piece (not shown in the drawing).

Two Cds photosensitive sensors 22A, 22B are connected in parallel outside of the area required for the finder's effective flux on the rear surface 8 of the pentagonal prism 7. The parallel connected sensors form a series-connection with the power source 13, and the ammeter 14. A variable resistance 15 able to respond to exposure parameters such as film sensitivity, shutter speed, etc. is inserted in parallel with the ammeter 14. The pointer 14' of the ammeter 14 can indicate the aperture value corresponding to the brightness of an object.

Figure 2:
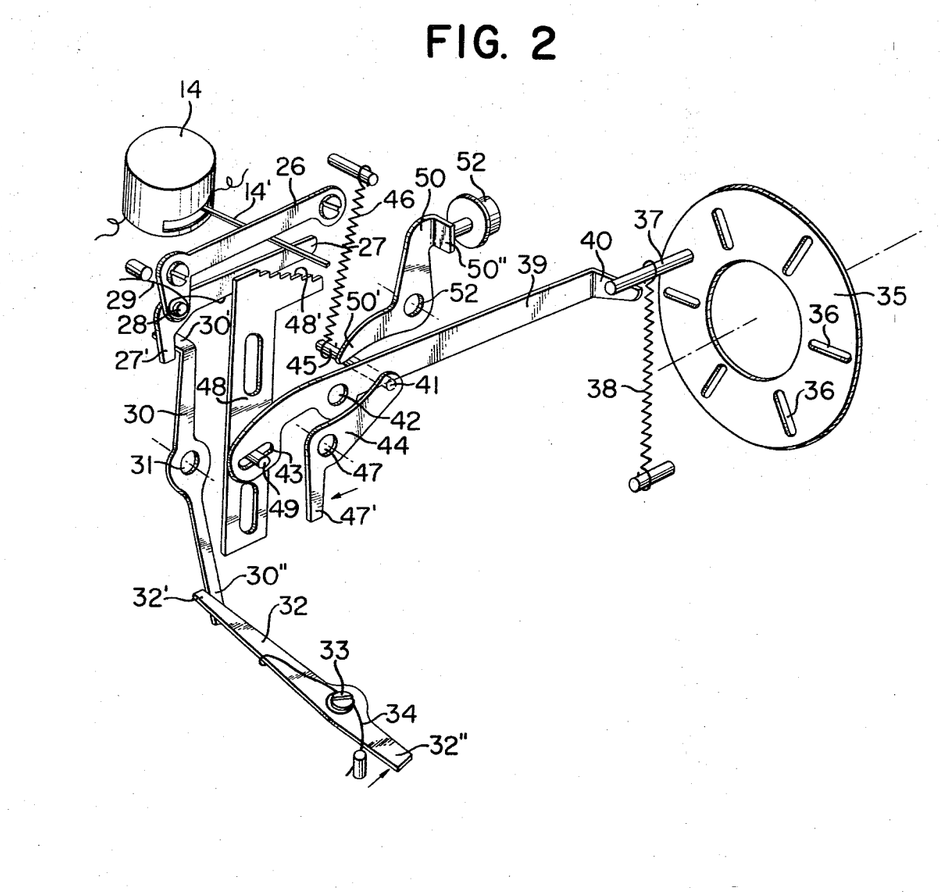
FIG. 2 is a sketch showing a mechanism to control the stop-down of lens by the change in the position of the pointer in an amperemeter.

In FIG. 2, a plate 26 fixed to the camera body receives the pointer 14'. A plate 27 holds down the pointer 14', and a spring 29 biases the plate 27 in a counter clockwise direction around an axle 28. 27' is a part of the plate 27, 28 is a rotating axle for the plate 27 and 29 is a spring which works on the plate 27 to a counter clockwise direction around the axle 28.

30 is an intermediate lever being engaged with 27' at its one end 30'. 31 is a center of rotation for the intermediate lever 30.

32 is a lever, one end 32' of which engages with one end 30'' of the intermediate lever 30. 33 is a rotation axle of the lever 32, 34 is a spring biasing the lever 32 to a clockwise direction around the axle 33.

35 is a ring to drive iris blades (not shown in the drawing) located within a specular bronze for lens, 36 is a groove for driving iris blades, 37 is a pin on the ring 35, 38 is a spring to rotate the ring 35, 39 is a lever, 40 is one end of the lever 39, engaging with the pin 37.

41 is a portion of the lever 44, 42 is a center of rotation of the lever 39, 43 is a groove of the other end of the lever 39.

44 is a lever, 45 is a pin on the lever 44, contacting a portion 41 of the lever 39, 46 is a spring which works on the pin 45 and a fixed end. 47 is a rotation center for the lever 44, 47' is a portion of the lever 44 and 48 is a sliding plate having a saw blade teeth 48'.

49 is a pin on the sliding plate 48, engaging with the groove 39 of the lever 44. 50 is a lever, 50' is one end of the lever 50, facing the pin 45 on the lever 44. 50'' is one end of the lver 50, 51 is a rotation center for the lever 50. 52 is a push button, which faces one end 50'' of the lever 50, stopping down the lens manually.

In FIG. 2 a mechanism to control the diaphragm of the lens by the swing of the pointer 14' of the amperemeter 14 is shown.

First, when one end 32'' of the lever 32 is pressed in the direction of arrow by a shutter release, the intermediate lever 30, allows the spring 29 to push up the lever 27 and the point 14' against the plate 26.

Then, when one end 47' of the lever 47 is pushed to the direction of arrow against the spring 46 by another mechanism (not shown in the drawing), the lever 39 which has been held in position by the contact of the pin 45 and a portion 41 of the lever 39 is rotated rotating in a clockwise direction by the iris blade driving spring 38. Thus the sliding plate 48 is pushed upward by the pin 48, and is shifted until the pointer 14' of the ammeter 14 contacts the saw blade teeth 48'. Therefore, the iris blade driving ring 35 rotates to a position corresponding to its stroke. It stops down to the diaphragm value indicated by the ammeter, controlling the amount of light on the film surface to an appropriate value.

Figure 3A:
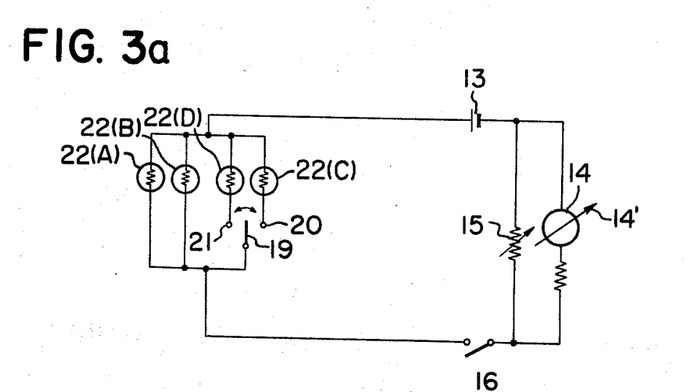

FIG. 3a shows a circuit for the exposure meter portion of FIG. 1, wherein CdS's 22A, 22B are arranged in a lateral direction outside of the area required for the effective flux, as a finder at the rear surface of the eyepiece as in the example of FIG. 1. The sensors 22A and 22B are connected in parallel. Sensors CdS's 22C 22D are arranged in a vertical direction outside of the area required for effective flux. One end thereof is connected in common with 22A, 22B. The other end with the switch plates 20, 21, so that switch change over with the switch plate 19 is made possible.

Figure 3B:
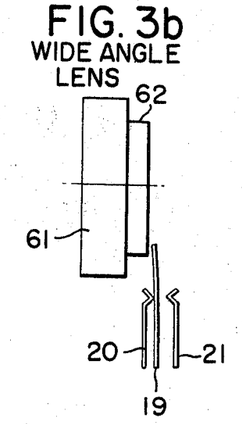
Figure 3C:
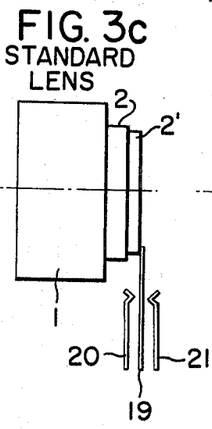
Figure 3D:
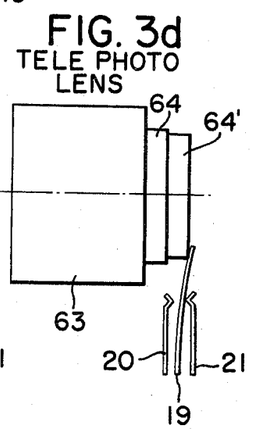
Figure 3E:
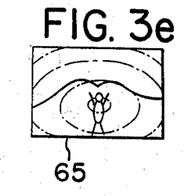
Figure 3F:
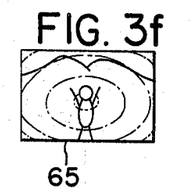
Figure 3G:
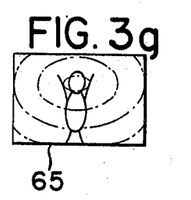

FIGS. 3(b) to 3(d) show the state of the switch when the wide angle lens 61, the standard lens 1 and telephoto lens 63 are mounted on the body. FIGS. 3(e) to 3(g) show the field of vision when the lenses of FIGS. 3(b) to 3(d) are used for an ordinary object. The concentration of sensing is shown by the dot-dash line within the frame 65.

When a standard lens is mounted on the body by means of the mounting part (2) as shown in FIG. 3c, the switch armature spring (19) does not contact the switch blades 20, 21. Thus, only the two CdS's 22A, 22B which are positioned at the lateral direction of the rear face 8 of the pentaprism 7 operate within the exposure meter circuit. Therefore the concentration of sensing will be such that the object in center part is concentratedly sensed.

When a wide angle lens 61 is mounted on the camera body, the spring 19 contacts the switch blade 20 Therefore, the Cds sensors (22A), (22B) and 22C are connected in parallel within the circuit, and by properly selecting the resistance value of said CdS sensor 22C the fully opened F-value with the standard lens 1 is compensated. Because 22C is placed at a lower position the center of sensing is shifted to lower part from the center. Thus, the main portion of an object can be preferentially sensed and at the same time the effect from the bright sky portion can be reduced.

Similarly, for the telephoto lens 63 and CdS 22D located at an upper position is connected and at the same time when the fully opened F-value with the standard lens is compensated, the major part of an object, that is a relatively high portion is preferentially sensed.

Thus according to the present invention, in fully opened TTL sensing, necessary compensation for a standard lens having the smallest fully-opened-F-value is made by adding in parallel the CdS sensor with a resistance value corresponding to the difference in the fully opened F-value of another interchangeable lens having larger fully opened F-value than that of the standard value. Therefore there will be no positional limitation in an associated movement. This can be realized with simple structure. At the same time, the sensing sensitivity distribution is matched to a lens of a particular focal distance, thereby securing proper exposure with greater dependability.

Figure 4A:
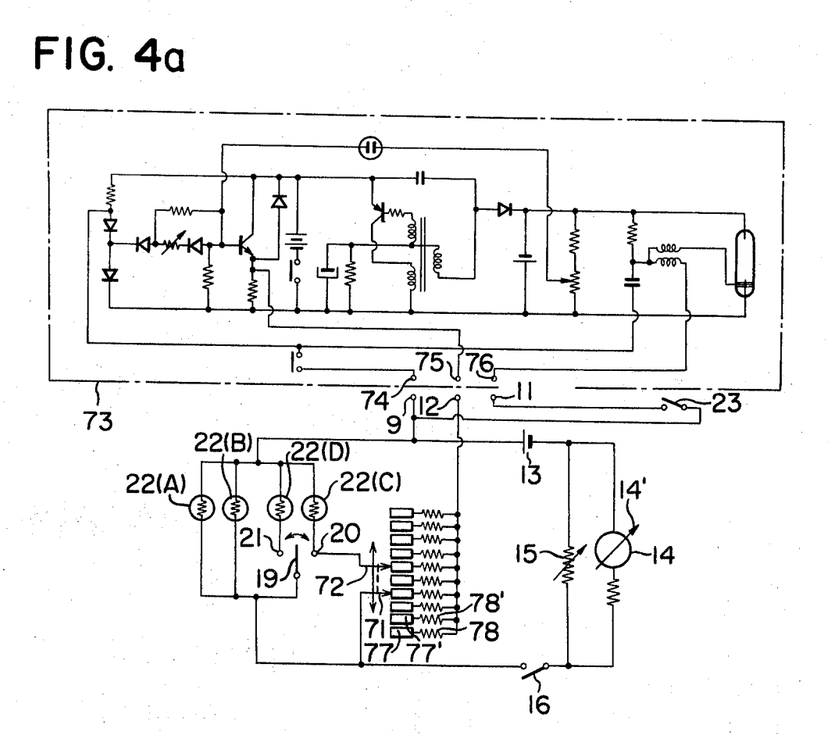
FIG. 4(a) is a circuit diagram showing a combination of the circuit shown in FIG. 3(a) in which flash photographing can be automatically done when an interchangeable lens is mounted and of a flush unit.

FIG. 4(a) shows an example of the circuit obtained by inserting a variable resistance linked with the shooting distance adjusting ring in the circuit shown in FIG. 2(a), so that the amount of exposure is automatically controlled for flash photography.

The slide 71 is linked with the adjusting ring and contacts the terminal 77 connected to the resistance 78. The other end of the resistance 78 is connected to the terminal 12 which is located at the accessory mounting part, and when the flash unit 73 is mounted to the accessory mounting member 9 (refer to FIG. 1), the terminals 74, 75, 76 of the flash unit 73 are connected to the terminals 9, 12, 11 of the body, respectively in an automatic manner.

To this flash unit 73 a certain voltage in reverse to the power source 13 of the exposure meter circuit is given as a signal of the state of charging of the main capacitor for the flash unit, between the terminals 74, 75, and said voltage becomes zero when charging of the main capacitor is completed, becoming close to the connected state of the terminals 9 and 12, thus the amperemeter in the circuit is made to swing by such resistance value as corresponding to the photographing distance so that the aperture diameter of the lens is controlled in a same manner as in daylight photographing.

At the same time when the terminals 77, 77'. . . . . and the resistances 78, 78'. . . . . are connected in parallel, and another sliding piece 72, which is separated from the sliding piece 71 by a certain distance and is associated with the distance ring, is provided as shown in the drawing and is connected with the switch plate 20, such resistance value as approximately corresponding to the shooting distance for a wide angle lens can be obtained when a wide angle lens is mounted, as shown in FIG. 3.

Figure 4B:
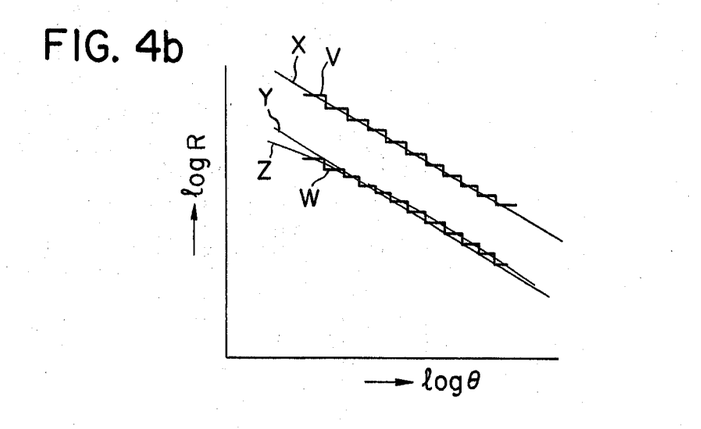
FIG. 4(b) is a graph showing the compensation in the above case.

Said state of proximaty is explained in the graph of FIG. 4(b), wherein the rotation angle θ of the distance adjusting ring is shown in logarithm at abscissa, while the logarithm of the resistance value R is shown at ordinate, and the proper resistance value for the standard lens is shown by the line X, while the actual resistance value is represented by the step-like line V as a fixed resistance is employed in this example.

On the other end proper resistance value for a wide angle lens is represented by the line Y, while the consolidated resistance value obtained by the two sliding pieces 71, 72 is represented by the line W, wherein the difference between the line Y and the line W is small, thus it is sufficiently usable within a certain range of linked movement.

Figure 5:
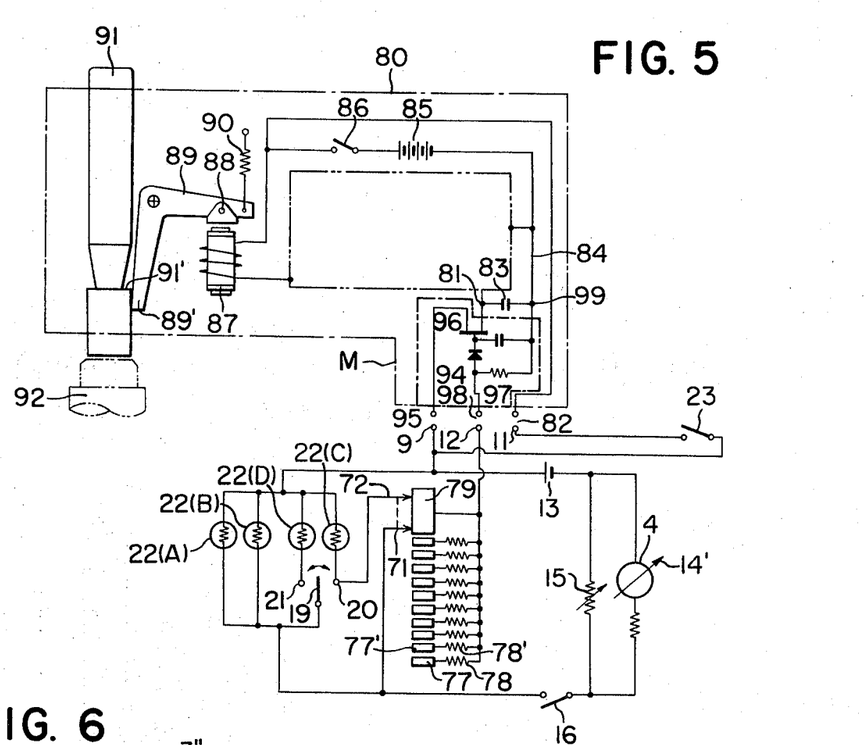
FIG. 5 is a circuit diagram showing the combination of the circuit at a body and an exposure control unit for low illumination.

FIG. 5 is a circuit diagram showing such state that a terminal 79 is provided outside of the range of linked movement of the distance adjusting ring, and the engagement of the sliding pieces 71, 72 with the distance adjusting ring is disengaged to shift the sliding pieces 71, 72 to such position as contacting the terminal 79.

The unit 80 is to control the exposure time in such low illumination zone that the exposure unit built in a camera can not function, and this unit is mounted to the accessory mounting member 9 of a camera (refer to FIG. 1), by having the terminals 81, 82 of the unit connected to the terminals 12, 11 of the body, respectively.

In FIG. 5, 83 is a capacitor for time control, 84 is a switching circuit, 85 is a power source, 86 is a main switch, 87 is an electric magnet, 88 is a steel piece, 89 is a lever, 89' is a claw part of the lever 89, 90 is a spring which works against the absorbing power of the magnet 87, 91 is a release button for the unit 80 and 92 is a release button for the body.

Now, its function of the embodiment shown in this drawing shall be explained. A shutter speed adjusting member (not shown in the drawing) at the body is set at B (bulb) position beforehand.

In FIG. 5 when the main switch 86 of the unit 80 is turned ON the terminals 98 82 of the unit 80 are connected to the terminals 12 11 of the body, the magnet 87 works to absorb the steel piece 88. In this state when the release button 91 of the unit 80 is pressed, the release button 92 of the body is also pressed, and the front screen (blades) of shutter is released and at the same time the claw part 89' of the lever 89 comes into the stepped part 91' of the release button 91 against the spring 90 by the absorbing power of the magnet 87, thus return of the release button is prevented.

On the other hand, the synchronized switch 23 is closed by shutter release, and the CdS's 22A, 22B are connected with the capacitor 83 within the unit 80 and the switching circuit 84, then after elapse of such time as corresponding to the brightness of an object at that time, current to the magnet 87 in the current is shut down, as a result by the function of the spring 90 the lever 89 rotates in a counter clockwise direction, and the claw part 89' is disengaged from the stepped part 91' of the release button 91, and 91 returns to its original state at the same time the release button 92 of the body also returns to original state, releasing the rear screen (blades) thus completing exposure.

In FIG. 5, the portion shown by dotted line is a memory device M which is necessary when a reflex mirror is of total reflection type and photoelectric conversion elements are provided at a finder optical path or its vicinity, and in the same drawing 93 is a capacitor to store the electric charge corresponding to the brightness of an object, 94 is a diode as a one way switch, 95 and 98 are terminals which become useful at the time of memorizing. 96 is a field effect transistor, 97 is a resistor, and 99 is a contact which constitutes a contact point with the memory device M at the time of memorizing.

Therefore, the reflex mirror consists of a fixed semitransparent mirror, and when a memory device is not needed the portion shown by the dotted line is omitted, while the terminal 81 is connected to the terminal 12 and the terminal 82 is connected to the terminal 11, and the terminal 12, as has been explained before, becomes an opened terminal.

Figure 6:
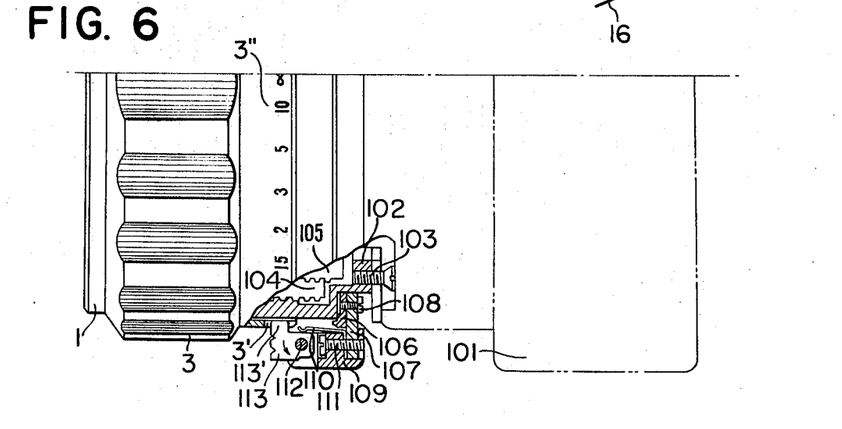
FIG. 6 is a drawing showing engagement of a distance adjusting ring and a variable resistance conversion device, which is associated therewith.

FIG. 6 is a drawing showing the engagement of the shooting distance adjusting ring of lens with the ring having a sliding piece.

It has such a structure that a ring 102 having at its portion threaded (helicoid) part is fixed at the body 101 of camera, and a rotating ring 104 having such a threaded part as fitting to the above-mentioned threaded part is fixed with the distance adjusting ring 3. The ring 3 has a distance scale 3" and a notched part 3' at its part.

On the other hand there is a ring 106 which is rotatable in engagement with the ring 102, and this ring 106 and a member 107 having a sliding piece (not shown in the drawing) are fixed together by a screw 108.

A member 109 is fixed with the member 107 by a screw 111, and the member 109 has a hole to receive an axle 112. A member 113 is rotatable for about 90° around the axle 112, and the tip 113' of the member is fitted with the notched part 3' of said ring 3.

A plate spring 110 is for click stop when the member 113 is rotated. The function shall be explained. In the state of FIG. 6, as the part 113' of the member 113 is engaged with the notched part 3' of the ring 3, when photographing distance is matched by the distance ring 3, the member 107 having a sliding piece rotates as much as same angle and such resistance value as corresponding to said distance can be obtained. At the time of flash photographing diaphragm is automatically controlled.

When flash photographing is not done or when a time control unit for low illumination zone is used, the member 113 is rotated about 90° to the direction of arrow, then the engagement between 3' and 113' is released, and the ring 107 having a sliding piece may be slided, as shown in FIG. 5, as far as it contacts the sliding pieces 71, 72 and the terminal 79, without relationship to the rotating position of 3.

As has been explained above, since a photoelectric element built in the body is used and sensing is of TTL system, error in sensing is small, and when this unit is mounted to the accessory mounting part of camera each terminal comes in contact automatically, the structure of unit itself becomes very simple and at the same time an exposure time control unit for low illumination zone with high accuracy can be obtained while the operation of the unit is remarkably simplified.

As has been explained heretofore, in the present invention variable electrical elements placed within a camera body such as a photo-electric element or a variable resistance is automatically changed over to appropriate value depending on the maximum aperture diameter signal of the interchangeable lens, thereby the amount of exposure is adjusted to appropriate value, therefore the exposure control system is automatically adjusted only by mounting process of the interchangeable lens and at the same time the applicable zone of the exposure control system can be easily enlarged by combinedly using the same together with such unit as a long time timer, flash device, etc.

Especially when such camera body is adopted as having both photoelectric elements and variable resistance elements being provided combinedly as variable electric elements, as shown in FIG. 1, FIG. 4 or FIG. 5, such function of a camera as having a series of different functions can be attained, and it is thus convenient.

What is claimed is:

1. A single lens reflex camera, comprising, a camera body, a plurality of objective lenses of different focal lengths interchangeably mountable on said camera body, a light measuring system mounted in the camera body, said light measuring system including a plurality of electro-photosensitive elements exposed to light traversing an objective lens mounted on said camera body, said elements being positioned to sense the light from different local areas of the total light passing through the objective lens, compensating means fixed on each of said objective lenses, said compensating means each corresponding to one of said elements, said light measuring system including an operating circuit and detecting means responsive to said compensating means for connecting the corresponding one of said elements to said circuit.

2. A camera as in claim 1, wherein said circuit includes an ammeter responsive to light incident on the connected one of said elements.

3. A camera as in claim 2, wherein said circuit includes maximum-aperture responsive means for also varying the current through the ammeter in response to the maximum apertures of said objective lenses, said objective lenses each including setting means coupled to said maximum-aperture responsive means for transmitting the maximum-aperture of the objective lens to said responsive means.

4. A camera as in claim 3, wherein said detecting means includes a leaf switch.

5. A camera as in claim 1, wherein the number of said elements is at least equal to three, the first of said elements being positioned to receive approximately the center area of the light through the objective lens mounted on the camera, said second one of said lenses being positioned to receive approximately an upper area of light through the lens, a third one of said elements being positioned to receive approximately a lower area of light through the lens.

6. A camera as in claim 5, wherein said detecting means includes a leaf switch for connecting the corresponding one of said elements on the basis of said compensating means.

7. A camera as in claim 6, wherein the compensating means which connects the second of said elements to the circuit is on a wide angle lens and the compensating means which connects the third of said elements is on a wide angle lens.

8. An exposure control system as in claim 6, wherein said exposure determining means further includes at least one photoconductor to receive light through the mounted lens and said variable resistive means include electrode means for short circuiting said sliders and connecting the photoconductor with said power source.

9. A system as in claim 8, wherein said exposure determining system further includes a timer device mountable on the camera body and having an input terminal with said means for short circuiting the sliders and the photoconductor as well as the power source.

10. A camera as in claim 5, wherein the detecting means connects the corresponding one of said elements together with a least one other one of said elements.

11. A camera as in claim 10, wherein said detecting means connects the second of said elements with the corresponding one of said first and third elements 12. A camera as in claim 10 wherein the number of elements is four and said detecting means connects the fourth and second of said elements together with the corresponding of the first and third of said elements.

13. A camera as in claim 1, wherein said detecting means includes a leaf switch for connecting one of the elements, and said circuit means includes an ammeter responsive to the light incident on the element connected by said switch to said circuit.

14. A camera as in claim 1, wherein said circuit includes a voltage source and said light responsive elements include photo-conductive transducers.

15. A camera as in claim , 1 wherein said light measuring system includes a power source, an ammeter for indicating exposure conditions connectable with said power source, variable resistive means connected with said ammeter and said power source, engagement means for engaging the focusing ring on the lens when it is mounted to said variable resistive means, said resistive means including a plurality of resistors each having a terminal, said variable resistive means including a pair of sliders for sliding from terminal to terminal, the spacing between the sliders corresponding to the difference of the rotating angle of the mounted lens.

16. A system as in claim 15, wherein said exposure determining system further includes an actuating switch connected in series with said power source and said ammeter and capable of being switched on and off, and engageable means having an engaging member operably mounted and associated with the actuating switch to turn it on only when it engages the focusing ring.

17. A camera as in claim 16, wherein said switching means includes a leaf switch member operatively connected with said projection means fixed on said lens and having an initial position, said projection means having two different lengths in accordance with the focal length and maximum operature value of said lens, said circuit having first and second fixed electrodes one of which is connected with said first element and the other of which is connected with said second element and the leaf switch member in its initial position, said first electrode being connected with said leaf switch member through the projection member of said telephoto lens and said second electrode being disconnected from said leaf switch member through the projection means of the standard lens.

18. An exposure control system as in claim 15, wherein said exposure determining system includes diaphragm means for said objective lens, said diaphragm means being adjustable by said ammeter.

19. A camera as in claim 15, wherein said compensating means on each lens includes a projection fixed on each lens, the projection a wide angle lens having a different length from the projection on a telephoto lens.

20. A camera as in claim 15, wherein said switching means includes on a leaf switch for connecting one of said first and second elements together with said third element with said galvanometer.

21. A camera as in claim 15 wherein said operating circuit includes a voltage source and said electro-photosensitive elements are photoconductive transducers.

22. A single lens reflex camera, comprising: a camera body, a plurality of objective lenses of different focal lengths interchangeably mountable on said camera body, a light measuring system mounted in the camera body, said light measuring system including a plurality of electro-photosensitive elements exposed to light traversing an objective lens mounted on said camera body; said elements being positioned to sense the light from different local areas of the total light passing through the objective lens, a first of said elements being positioned in the camera body to receive light from an upper vertical portion of a subject, a second element positioned in the camera body to receive light from a lower vertical portion of a subject and a third element positioned in the camera body to receive light from a center vertical portion of a subject, an operating circuit including exposure indicating means having a galvanometer connected in said operating circuit, switching means selectively connecting said third element and one of other elements, with said galvanometer, and compensating means fixed on each of said lenses and operatively connected with said switching means for switching said switching means according to the focal length and maximum operature value of each lens mounted on the camera body, the compensating means on a wide angle objective lens of said lenses switching said switching means so that said galvanometer is actuated substantially by said second element, the compensating means on a telephoto objective lens of said lenses switching the switching means so the galvanometer is acuated substantially by said first element.

* * * * *